United States Patent
Xiong et al.

(10) Patent No.: US 10,821,604 B2
(45) Date of Patent: Nov. 3, 2020

(54) COMPUTER-IMPLEMENTED METHOD FOR ROBOT POSTURE DETECTION AND ROBOT

(71) Applicant: UBTECH Robotics Corp, Shenzhen (CN)

(72) Inventors: Youjun Xiong, Shenzhen (CN); Haiwu Su, Shenzhen (CN)

(73) Assignee: UBTECH ROBOTICS CORP., Shenzhen (CN)

(*) Notice: Subject to any disclaimer, the term of this patent is extended or adjusted under 35 U.S.C. 154(b) by 397 days.

(21) Appl. No.: 15/853,600

(22) Filed: Dec. 22, 2017

(65) Prior Publication Data

US 2019/0118377 A1 Apr. 25, 2019

(30) Foreign Application Priority Data

Oct. 20, 2017 (CN) .......................... 2017 1 0983266

(51) Int. Cl.
- *G05B 19/04* (2006.01)
- *G05B 19/18* (2006.01)
- *B25J 9/16* (2006.01)

(52) U.S. Cl.
CPC ............ *B25J 9/1653* (2013.01); *B25J 9/163* (2013.01); *B25J 9/1692* (2013.01); *G05B 2219/40342* (2013.01); *Y10S 901/09* (2013.01)

(58) Field of Classification Search
CPC ........ B25J 9/163; B25J 9/1653; B25J 9/1692; G05B 2219/40342; Y10S 901/09
See application file for complete search history.

(56) References Cited

U.S. PATENT DOCUMENTS

| | | | | |
|---|---|---|---|---|
| 6,064,167 A | * | 5/2000 | Takenaka | B25J 19/005 318/568.12 |
| 2011/0160908 A1 | * | 6/2011 | Iba | B25J 9/1679 700/262 |
| 2011/0172825 A1 | * | 7/2011 | Lee | B25J 9/161 700/261 |
| 2012/0316683 A1 | * | 12/2012 | Seo | B62D 57/032 700/261 |
| 2013/0041509 A1 | * | 2/2013 | Saito | B25J 9/06 700/261 |
| 2013/0144441 A1 | * | 6/2013 | Kanazawa | B25J 9/1607 700/263 |
| 2013/0218345 A1 | * | 8/2013 | Lee | B25J 9/162 700/261 |

(Continued)

FOREIGN PATENT DOCUMENTS

| CN | 101100059 A | 1/2008 |
|---|---|---|
| CN | 104589304 A | 5/2015 |

*Primary Examiner* — Harry Y Oh

(57) ABSTRACT

The present disclosure is applicable to robot technology. A method for robot posture detection and a robot are provided. The method includes: obtaining a position parameter of each of nodes of a robot; obtaining a first weighted value of each of the nodes corresponding to the position parameter of the corresponding node; calculating a weighted value of each of body parts of the robot based on the first weighted value of the node of the corresponding body part; and correcting an original parameter of a center of gravity of the robot according to a body gravity center influence factor of each of the body parts, and the weighted value of each of the body parts.

10 Claims, 7 Drawing Sheets

(56) References Cited

U.S. PATENT DOCUMENTS

| | | | |
|---|---|---|---|
| 2015/0005941 A1* | 1/2015 | Milenkovic | B25J 9/163 |
| | | | 700/262 |
| 2015/0202768 A1* | 7/2015 | Moridaira | B62D 57/032 |
| | | | 700/258 |
| 2016/0059408 A1* | 3/2016 | Isobe | B25J 5/007 |
| | | | 700/253 |
| 2017/0266811 A1* | 9/2017 | Ogawara | B25J 13/085 |

* cited by examiner

COMPUTER-IMPLEMENTED METHOD FOR ROBOT POSTURE DETECTION AND ROBOT

CROSS REFERENCE TO RELATED APPLICATIONS

This application claims priority to Chinese Patent Application No. 201710983266.6, filed Oct. 20, 2017, which is hereby incorporated by reference herein as if set forth in its entirety.

BACKGROUND

1. Technical Field

The present disclosure generally relates to robot technology, and particularly to a computer-implemented method for robot posture detection, and a robot.

2. Description of Related Art

A robot is a machine capable of performing works automatically, which can accept commands from humans, execute pre-programmed programs, and act on principles made based on artificial intelligence techniques, and be used to assist or replace humankinds to perform certain works such as manufacturing, construction, or dangerous works.

A robot is generally composed of an execution mechanism, a driving device, a detection device, a control system, complex machineries, and other components. In which, the detection device is used to detect the movement and operation condition of the robot in real time and feedback to the control system according to needs. After comparing with the setting information, the execution mechanism is adjusted so as to ensure that the movement of the robot conforms to predetermined requirements. The sensors used as the detection device can be divided into two categories: one is the internal information sensor used to detect the internal conditions of each part of the robot, for example, the position, velocity and acceleration of each of nodes (joint), and then the measured information is transmitted to the controller as a feedback signal so as to form closed-loop control; the other is the external information sensor used to obtain the information about the robot's operation object or the external environment so that the robot's operations can adapt to changes in the external environment so as to achieve a higher level of automation and even make the robot have a certain "sensation" which makes the robot intelligent, for instance, visual, acoustic and other external sensors may provide the relative information of the operation object and the operation environment, and the information may be used to form a large feedback loop, which will greatly improve the robot's operation accuracy.

At present, the ordinary robot posture detection technologies which are based on single sensor detection data can not accurately detect the posture of the robot due to the problems such as the sensor abnormality and the error in the sensor detection data is too large.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

Figure 1:
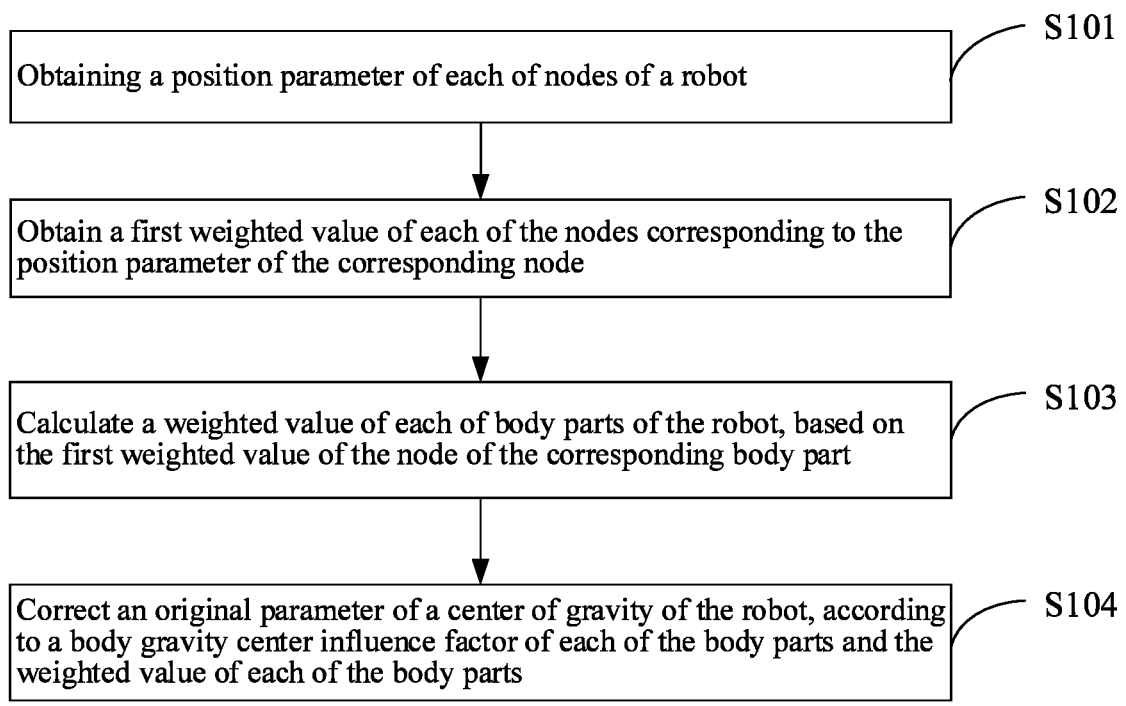
FIG. 1 is a flow chart of a robot posture detection method according to an embodiment of the present disclosure.

In the following description, for the purpose of explanation instead of limitation, specific details such as particular system architectures, techniques, etc. are set forth so as to understand the embodiments of the present disclosure thoroughly. However, it will be apparent to those skilled in the art that the present disclosure may be implemented in other embodiments without these specific details. In other instances, detailed descriptions of well-known systems, devices, circuits, and methods are omitted so as to avoid unnecessary details to obscure the description of the present disclosure.

For the purpose of illustrating the technical scheme of the present disclosure, the following describes the specific embodiments.

It should be understood that the terms "includes (comprises)" and "including (comprising)" indicate the presence of stated features, entireties, steps, operations, elements and/or components when used in the description and the appended claims, while do not preclude the presence or addition of one or a plurality of other features, entireties, steps, operations, elements, components and/or their assemblies.

It should also be understood that the terminology used in the description of the present disclosure is merely for the purpose of describing particular embodiments and is not intended to limit the present disclosure. As used in the description and the appended claims of the present disclosure, the singular forms "one", "a" and "the" are intended to include the plural forms unless the context clearly indicates otherwise.

It should also be understood that in the description of the present disclosure, the terms "first", "second" and "third", etc., are used merely for distinguishing and can not be understood as indicating or implying the relative importance, and can not be understood that there must be a "first" in front of "second", that is, it can not be understood as having a specific quantitative meaning.

In specific implementations, the terminal device described in the embodiments of the present disclosure includes, but not limited to, a robot. In the following specific implementations, for the convenience of description, a robot will be taken as an example of the terminal device, and those skilled in the art may understand that the terminal device is not limited to a robot.

In the following discussion, the robot including a servo and a gyroscope is described. However, it should be understood that the robot may include one or a plurality of other physical user interface devices such as a physical keyboard, mouse and/or joystick.

The terminal device supports various applications such as one or more of the following: a drawing application, a presentation application, a word processing application, a website creation application, a disc burning application, a spreadsheet application, a game application, a phone application, a video conferencing application, an email application, an instant messaging application, an exercise support application, a photo management application, a digital camera application, a digital video camera application, a web browsing application, a digital music player application, and/or a digital video player application.

The various applications capable of executing on the terminal device may use at least one common physical user interface device such as a touch-sensitive surface. One or more functions of the touch-sensitive surface and the corresponding information displayed on the terminal device may be adjusted and/or changed between applications and/or within the corresponding application. As such, the common physical architecture (e.g., a touch-sensitive surface) of the terminal device may support a variety of applications having a user interface which is intuitive and transparent to the user.

FIG. 1 is a flow chart of a robot posture detection method according to an embodiment of the present disclosure. The main body of the method in this embodiment is a robot posture detection device. The device may be implemented by software and/or hardware and integrated into a robot, and is suitable for the instances in which robot posture detection needs to be performed. In this embodiment, the method is a computer-implemented method executable for a processor. As shown in FIG. 1, the method includes the following steps:

S101: obtaining a position parameter of each of nodes of a robot.

In which, each of the nodes (i.e., joints) of the robot are equipped with a servo. The servo includes a position sensor, and the rotation angle, that is, the position parameter such as 45°, 60°, 90° and 100° can be obtained through the position sensor. Different servos may be different in the range of the rotation angle such as 0°-180° and 0°-360°, where the rotation angle is merely an example.

Specifically, step S101 includes: obtaining the position parameter of the each of the nodes utilizing the position sensor of the servo on the node of the robot.

S102: obtaining a first weighted value of each of the nodes corresponding to the position parameter of the corresponding node.

In which, for different position parameters, a node gravity center (center-of-gravity) offset weighted value of each of the nodes (that is, a first weighted value of each of the nodes) corresponding to the position parameter of the corresponding node is searched according to a preset first correspondence (corresponding relationship), where the first correspondence includes a correspondence of the position parameter of each of the nodes and the node gravity center offset weighted value of each of the nodes.

In an embodiment of the present disclosure, for example, when the position parameters are 6.5°, 15°, 45°, 60°, 95°, and 112°, the corresponding node gravity center offset weighted value are 2, 3, 7, 10, 12, and 15, respectively. It should be noted that the first correspondence is empirically designed and related to the structure and the volume of the robot, and the like, where the structure includes the weight, the geometric center, and the like. The examples herein are merely exemplary descriptions, and the first correspondence is not specifically limited in the present disclosure.

Figure 2:
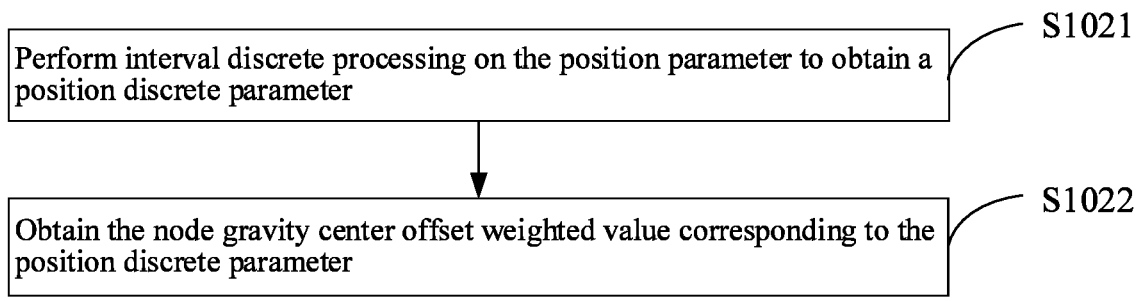
FIG. 2 is a flow chart of step S102 of the robot posture detection method of FIG. 1 of the present disclosure.

Furthermore, optionally, as shown in FIG. 2, step S102 includes steps S1021 and S1022.

S1021: performing interval discrete processing on the position parameter to obtain a position discrete parameter.

In which, in one embodiment of the present disclosure, if the range of the rotation angle of the servo is 0°-360°, the angle range is equally divided into 36 left-opened and right-closed intervals as followed: (0°, 10°], (10°, 20°], (20°, 30°], . . . , (350°, 360°]. The position parameter within the first interval (0°, 10°], for example, 6.5°, has the corresponding position discrete parameter of D1; the position parameter within the first interval (10°, 20°], for example, 15°, has the corresponding position discrete parameter of D2; the position parameter within the first interval (40°, 50°], for example, 45°, has the corresponding position discrete parameter of D5; the position parameter within the first interval (50°, 60°], for example, 60°, has the corresponding position discrete parameter of D6; the position parameter within the first interval (90°, 100°], for example, 95°, has the corresponding position discrete parameter of D10; the position parameter within the first interval (110°, 120°], for example, 112°, has the corresponding position discrete parameter of D12. It can be seen that the corresponding position discrete parameter can be obtained through discrete processing the position parameter interval in a similar way. It should be noted that the example herein is merely for illustration, other ways may also be taken, and it is also possible to divide the range of the rotation angle of the servo equally or non-equally into other numbers of left-opened and right-closed intervals or left-closed and right-opened intervals, where the number and the length of the intervals can be selected and set according to actual needs. Those skilled in the art can understand that, the more the total number of intervals is, the higher the accuracy is while the more the calculation and the lower the computational efficiency is. In addition, if the range of the rotation angle of the servo is 0°-180°, the same method is used. The method for discrete processing the interval is not specifically limited in the present disclosure.

S1022: obtaining the node gravity center offset weighted value corresponding to the position discrete parameter.

In which, for different position discrete parameters, the node gravity center offset weighted value corresponding to the position discrete parameter is searched according to a preset third correspondence relationship, where the third correspondence relationship includes a correspondence of the position discrete parameter and the node gravity center offset weighted value.

In an embodiment of the present disclosure, for example, when the position discrete parameters are D1, D2, D5, D6, D10, and D12, the corresponding node gravity center offset weighted value are 4, 5, 8, 11, 13, and 15, respectively. It should be noted that the third correspondence is empirically designed and related to the structure and the volume of the robot, where the structure includes the weight and the geometric center. The examples herein are merely exemplary descriptions, and the third correspondence is not specifically limited in the present disclosure.

Using steps S1021 and S1022, the position discrete parameter is obtained through the interval discrete processing, and then the node gravity center offset weighted value corresponding to the position discrete parameter is obtained. In comparison with directly obtaining the node gravity center offset weighted value corresponding to the position discrete parameter, the total data processing is reduced while ensuring the accuracy, which improves the computational efficiency.

S103: calculating a weighted value of each of body parts of the robot, based on the first weighted value of the node of the corresponding body part.

In which, for anthropomorphic consideration, the body of a robot is often partitioned. The body parts may be respectively referred to as a base, a waist, an arm, a wrist, a hand (e.g., a gripper or an end effector) and a walking part (for movable robot) and so on. The entirety of the robot includes a plurality of nodes, where the plurality of nodes are sequentially numbered as i, and i is a positive integer. Each of the body parts may include one or more nodes as needed, where the serial number of the body part is marked as j, the serial number of the body part may be marked sequentially while j is a positive integer. In addition, the nodes and the body parts may be marked arbitrarily as well, while the marks are merely for distinguishing the nodes and the body parts. The present disclosure is described by using sequence numbers as examples, and the sequence numbers are merely for the convenience of understanding the following calculation formulas, and no limitation is made thereto.

If the body part j includes nodes N to M, where N and M are positive integers and M≤N, the node gravity center offset weighted value of the node N which is obtained through step S102 is $W_N$, the node gravity center offset weighted value of the node M is $W_M$, and the body gravity center offset weighted value (that is, the weighted value) $BW_j$ of the body part j is calculated through the node gravity center offset weighted value $W_i$ as follows: $BW_j=(W_N+W_{N+1}+\ldots+W_{M-1}+W_M)/(M-N+1)$.

Illustratively, if the body part j=3 is an arm, the arm includes the node N=5 to the node M=8. The node gravity center offset weighted value of the node N=5 which is obtained through step S102 is $W_5$, the node gravity center offset weighted value of the node N=6 is $W_6$, the node gravity center offset weighted value of the node N=7 is $W_7$, the node gravity center offset weighted value of the node M=8 is $W_8$, and the body gravity center offset weighted value $BW_3$ of the body part j=3 is calculated through the four node gravity center offset weighted values $W_5$, $W_6$, $W_7$, and $W_8$ of the body part j=3 which is the arm as follows: $BW_3=(W_5+W_6+W_7+W_8)/(8-5+1)=(W_5+W_6+W_7+W_8)/4$.

S104: correcting an original parameter of a center of gravity of the robot, according to a body gravity center influence factor of each of the body parts and the weighted value of each of the body parts.

In which, the robot includes a gyroscope. If the robot is a humanoid robot, the gyroscope may be disposed on a heart portion of the robot, and an original parameter of the center of gravity of the robot can be obtained through the gyroscope. The original parameter of the center of gravity of the robot includes an original offset direction $a_o$ of the center of gravity of the robot and an original offset $v_o$ of the center of gravity of the robot.

Optionally, before step S104, the method further includes: obtaining the original parameter of the center of gravity of the robot utilizing the gyroscope of the robot. This step is merely required to be performed before S104, and there is no sequential requirement with respect to steps S101, S102 and S103.

Figure 3:
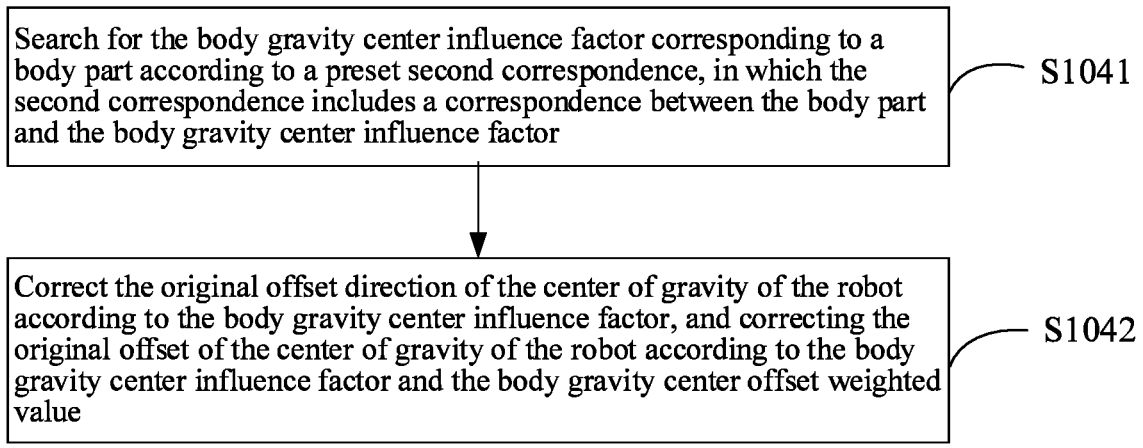
FIG. 3 is a flow chart of step S104 of the robot posture detection method of FIG. 1 of the present disclosure.

Optionally, as shown in FIG. 3, step S104 includes steps S1041 and S1042.

S1041: searching for the body gravity center influence factor corresponding to a body part according to a preset second correspondence, in which the second correspondence includes a correspondence between the body part and the body gravity center influence factor.

In which, the serial numbers of the body part of the robot are sequentially numbered as j, and the total number of the body parts is K. If the body part of the robot includes the body parts 1 to K, in accordance with a preset second correspondence, the body gravity center influence factor sequentially corresponding to the body parts j=1 to j=K to be searched are $f_1, f_2, \ldots,$ and $f_K$. The body gravity center influence factor is not normalized.

Illustratively, the body parts of a certain robot are j=1, 2, 3, 4, and 5, and the corresponding preset body gravity center influence factors are $f_1=2$, $f_2=3$, $f_3=1.2$, $f_4=0.2$, and $f_5=0.4$, respectively. The exemplified body gravity center influence factors here are not normalized. It should be noted that the second correspondence is empirically designed and related to the structure and the volume of the body part of the robot with respect to the structure and the volume of the entirety of the robot, where the structure includes the weight, the geometric center, and the like. The examples herein are merely exemplary descriptions, and the second correspondence is not specifically limited in the present disclosure.

S1042: correcting the original offset direction of the center of gravity of the robot according to the body gravity center influence factor, and correcting the original offset of the center of gravity of the robot according to the body gravity center influence factor and the body gravity center offset weighted value.

In which, the corrected original offset direction $a_o$ of the center of gravity of the robot may be referred to as a offset direction $a_n$ of a center of gravity of entirety of the robot, and the corrected original offset $v_o$ of the center of gravity of the robot may be referred to as a offset $v_n$ of the center of gravity of entirety of the robot. The offset direction $a_n$ of the center of gravity and the offset $v_n$ of the center of gravity reflect the overall posture of the robot.

If the body parts of the robot include the body parts 1 to K, where K is the total number of the body parts, the body gravity center influence factors sequentially corresponding to the body parts j=1 to j=K which are obtained through step S1041 are $f_1, f_2, \ldots,$ and $f_K$. The original offset direction $a_o$ of the center of gravity is corrected according to the body gravity center influence factor $f_j$ to obtain the offset direction of the center of gravity of entirety of the robot $a_n=[1+(f_1+f_2+\ldots+f_K)/K] \cdot a_o$.

The body gravity center offset weighted value $BW_j$ of the body part j is calculated according to step S103. If the body part j of the robot includes the body parts 1 to K, the body gravity center offset weighted value $BW_j$ of the body parts 1 to K are sequentially $BW_1, BW_2, \ldots,$ and $BW_K$. The original offset $v_o$ of the center of gravity of the robot is corrected according to the body gravity center influence factor $f_j$ and the body gravity center offset weighted value $BW_j$ to obtain the offset of the center of gravity of entirety of the robot $v_n=v_o+(BW_1 \times f_1+BW_2 \times f_2+\ldots+BW_K \times f_K)/K$.

In this embodiment, the node gravity center offset weighted value is obtained through the position parameter of each of the nodes, the body gravity center offset weighted value of each of the body parts is calculated according to the body part, and then the original parameter of the center of gravity of the robot is corrected utilizing the body gravity center influence factor and the body gravity center offset weighted value of the body part, thereby correcting the original parameter of the center of gravity of the robot obtained through the gyroscope through dividing the robot into parts and then reintegrating the robot into an entirety, and the detection data of the overall posture of the robot with high accuracy is eventually obtained, which reduces the error in the posture detection of the robot.

Another embodiment of the present disclosure provides a robot posture detection apparatus, which includes modules for executing each step in the robot posture detection method described in any of the above-mentioned embodiments, and the apparatus may be integrated into the robot. Please refer to the embodiments of the above-mentioned method for details not described in this embodiment.

Figure 4:
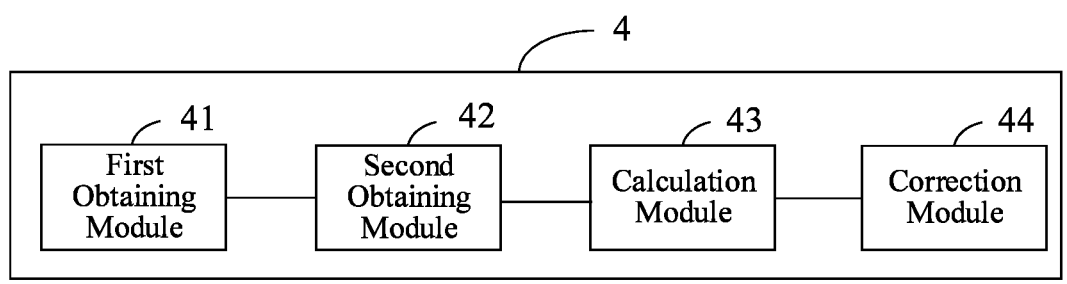
FIG. 4 is a block diagram of a robot posture detection apparatus according to an embodiment of the present disclosure.

As shown in FIG. 4, a robot posture detection apparatus 4 according to an embodiment of the present disclosure includes a first obtaining module 41, a second obtaining module 42, a calculation module 43, and a correction module 44. In this embodiment, the apparatus 4 includes a processor and a memory storing instructions executable for the processor, where the instructions functions as the first obtaining module 41, the second obtaining module 42, the calculation module 43, and the correction module 44.

In which, the first obtaining module 41 is configured to obtain a position parameter of each of nodes of a robot.

The second obtaining module 42 is configured to obtain a node gravity center offset weighted value corresponding to the position parameter.

The calculation module 43 is configured to calculate a body gravity center offset weighted value for each of the body parts of the robot based on the node gravity center offset weighted value.

The correction module 44 is configured to correct an original parameter of the center of gravity of the robot according to a body gravity center influence factor and the body gravity center offset weighted value for each of the body parts.

Optionally, the second obtaining module 42 is specifically configured to search for the node gravity center offset weighted value corresponding to the position parameter according to a preset first correspondence, where the first correspondence includes a correspondence between the position parameter and the node gravity center offset weighted value.

Figure 5:
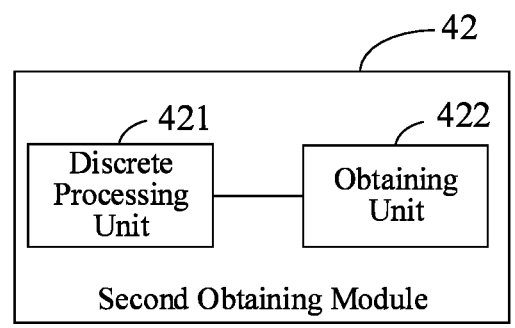
FIG. 5 is a block diagram of the module 42 of the robot posture detection apparatus of FIG. 4 of the present disclosure.

Optionally, as shown in FIG. 5, the second obtaining module 42 includes a discrete processing unit 421 and an obtaining unit 422.

In which, the discrete processing unit 421 is configured to perform interval discrete processing on the position parameter to obtain a position discrete parameter.

The obtaining unit 422 is configured to obtain the node gravity center offset weighted value corresponding to the position discrete parameter.

Furthermore, the obtaining unit 422 is specifically configured to search the node gravity center offset weighted value corresponding to the position discrete parameter according to a preset third correspondence, where the third correspondence includes a correspondence of the position discrete parameter and the node gravity center offset weighted value.

Figure 6:
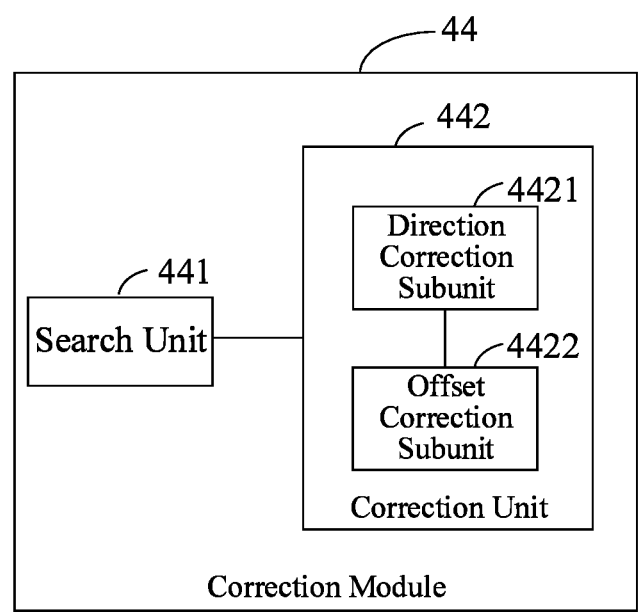
FIG. 6 is a block diagram of the module 44 of the robot posture detection apparatus of FIG. 4 of the present disclosure.

Optionally, as shown in FIG. 6, the correction module 44 includes a search unit 441 and a correction unit 442.

In which, the search unit 441 is configured to search for the body gravity center influence factor corresponding to a body part according to a preset second correspondence, in which the second correspondence includes a correspondence between the body part and the body gravity center influence factor.

The correction unit 442 is configured to correct the original offset direction of the center of gravity of entirety of the robot according to the body gravity center influence factor, and correct the original offset of the center of gravity of entirety of the robot according to the body gravity center influence factor and the body gravity center offset weighted value.

Furthermore, the correction unit 442 includes a direction correction subunit 4421 and an offset correction subunit 4422.

In which, the direction correction subunit 4421 is configured to correct the original offset direction of the center of gravity of entirety of the robot according to the body gravity center influence factor.

The offset correction subunit 4422 is configured to correct the original offset of the center of gravity of entirety of the robot according to the body gravity center influence factor and the body gravity center offset weighted value.

Figure 7:
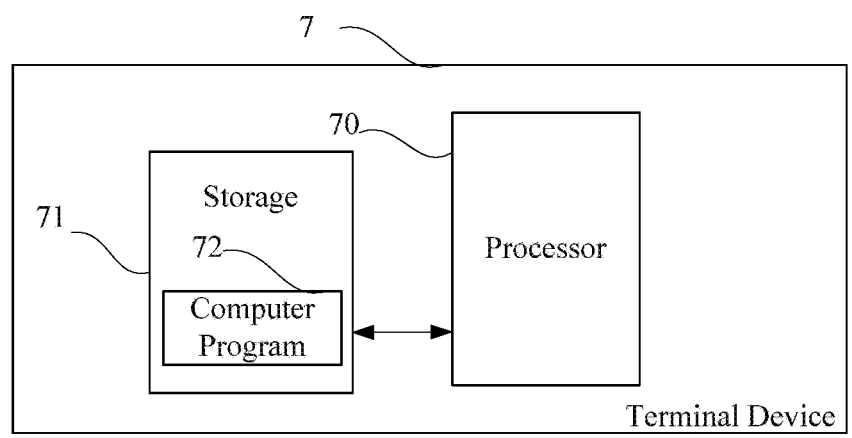
FIG. 7 is a block diagram of a terminal device according to an embodiment of the present disclosure.

As shown in FIG. 7, a terminal device according to an embodiment of the present disclosure includes a processor 70, a storage 71, and a computer program 72 stored in the storage 71 and is executable for the processor 70, for example, a robot posture detection program. The processor 70 executes the computer program 72 to implement the steps in each of the above-mentioned embodiments of the robot posture detection method, for example, steps S101 to S104 shown in FIG. 1. Alternatively, the processor 70 executes the computer program 72 to implement the functions of each module/unit in the above-mentioned device embodiments, for example, the functions of the modules 41 to 44 shown in FIG. 4. In this embodiment, the storage 71 is a memory.

Illustratively, the computer program 72 may be divided into one or more modules/units, which are stored in the storage 71 and executed by the processor 70 to realize the present disclosure. The one or more modules/units may be a series of computer program instruction sections capable of performing specific functions, where the instruction sections are for describing the execution process of the computer program 72 in the terminal device 7. For example, the computer program 72 may be divided into a first obtaining module, a second obtaining module, a calculation module, and a correction module (may be modules in a virtual device). Specific functions of each module are as follows:

The first obtaining module 41 is configured to obtain a position parameter of each of the nodes of a robot.

The second obtaining module 42 is configured to obtain a node gravity center offset weighted value corresponding to the position parameter.

The calculation module 43 is configured to calculate a body gravity center offset weighted value for each of the body parts of the robot based on the node gravity center offset weighted value.

The correction module 44 is configured to correct an original parameter of the center of gravity of the robot according to a body gravity center influence factor and the body gravity center offset weighted value for each of the body parts.

The terminal device 7 may be a robot. The terminal device 7 may include, but is not limited to, a processor 70 and a storage 71. It can be understood by those skilled in the art that FIG. 7 is merely an example of the terminal device 7 and does not constitute a limitation on the terminal device 7, and may include more or fewer components than those shown in the figure, or combine some components or different components, for example, the terminal device 7 may further include an input/output device, a network access device, a bus, a servo, a gyroscope, and the like.

The processor 70 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 71 may be an internal storage unit of the terminal device 7, for example, a hard disk or a memory of the terminal device 7. The storage 71 may also be an external storage device of the terminal device 7 such as a plug-in hard disk, a smart media card (SMC), a secure digital (SD) card, a flash card and so on. Furthermore, the storage 71 may include both an internal storage unit and an external storage device of the terminal device 7. The storage 71 is configured to store the computer program and other programs and data required by the terminal device 7. The storage 71 may also be configured to temporarily store data which has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present application. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus/terminal device and method may be implemented in other manners. For example, the above-mentioned apparatus/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any entity or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented method for robot posture detection, comprising:
    providing a robot comprising a processor, a plurality of body parts configured to move, and a gyroscope, wherein each of the body parts has at least one node, and each of the nodes comprises a servo having a position sensor, the processor is electronically coupled to the gyroscope and the servo of each of the nodes;

obtaining, by the position sensor, a position parameter of each of the nodes;

obtaining, by the processor, a first weighted value of each of the nodes corresponding to the position parameter of the corresponding node, according to a preset first corresponding relationship, wherein the preset first corresponding relationship comprises correspondence between a plurality of position parameters of each of the nodes and a plurality of the first weighted values of each of the nodes, and the preset first corresponding relationship is set based on a weight, a geometric center, and a volume of an entirety of the robot;

calculating, by the processor, a weighted value of each of the body parts, based on the first weighted value of the node of the corresponding body part;

searching, by the processor, a body gravity center influence factor of each of the body parts, according to a preset second corresponding relationship, and wherein the preset second corresponding relationship comprises correspondence between the body parts and body gravity center influence factors and is set based on a relationship between a weight, a geometric center, and a volume of each of the body parts and the weight, the geometric center, and the volume of the entirety of the robot;

correcting, by the processor, an original parameter of a center of gravity of the robot obtained by the gyroscope, according to the body gravity center influence factor of each of the body parts, and the weighted value of each of the body parts.

2. The method of claim 1, wherein the step of obtaining, by the processor, the first weighted value of each of the nodes corresponding to the position parameter of the corresponding node, according to the preset first corresponding relationship, comprises:

performing, by the processor, an interval discrete processing on the position parameter of each of the nodes, to obtain a position discrete parameter of each of the nodes; and obtaining, by the processor, the first weighted value of each of the nodes corresponding to the position discrete parameter, according to a preset third corresponding relationship, wherein the preset third corresponding relationship is set based on the weight, the geometric center, and the volume of the entirety of the robot.

3. The method of claim 1, wherein the original parameter of the center of gravity of the robot comprises an original offset direction of the center of gravity of the robot, and an original offset of the center of gravity of the robot.

4. The method of claim 3, wherein the step of correcting, by the processor, the original parameter of the center of gravity of the robot obtained by the gyroscope, according to the body gravity center influence factor of each of the body parts, and the weighted value of each of the body parts, comprises:

correcting, by the processor, the original offset direction of the center of gravity of the robot according to the body gravity center influence factor of each of the body parts; and correcting the original offset of the center of gravity of the robot according to the body gravity center influence factor of each of the body parts, and the weighted value of each of the body parts.

5. The method of claim 1, wherein the robot is a humanoid robot, the gyroscope is disposed on a heart portion of the robot.

6. A robot, comprising:
a processor;
a plurality of body parts configured to move, wherein each of the body parts has at least one node, and each of the nodes comprises a servo having a position sensor;
a gyroscope, wherein the processor is electronically coupled to the gyroscope and the servo of each of the nodes;
a memory; and
one or more computer programs stored in the memory and configured to execute a method, the method comprising steps of:
obtaining a position parameter of each of the nodes;
obtaining a first weighted value of each of the nodes corresponding to the position parameter of the corresponding node, according to a preset first corresponding relationship, wherein the preset first corresponding relationship comprises correspondence between a plurality of position parameters of each of the nodes and a plurality of the first weighted values of each of the nodes, and the preset first corresponding relationship is set based on a weight, a geometric center, and a volume of an entirety of the robot;
calculating a weighted value of each of the body parts, based on the first weighted value of the node of the corresponding body part;
searching a body gravity center influence factor of each of the body parts, according to a preset second corresponding relationship, and wherein the preset second corresponding relationship comprises correspondence between the body parts and body gravity center influence factors and is set based on a relationship between a weight, a geometric center, and a volume of each of the body parts and the weight, the geometric center, and the volume of the entirety of the robot;
correcting an original parameter of a center of gravity of the robot obtained by the gyroscope, according to the body gravity center influence factor of each of the body parts, and the weighted value of each of the body parts.

7. The robot of claim 6, wherein the step of obtaining the first weighted value of each of the nodes corresponding to the position parameter of the corresponding node, according to the preset first corresponding relationship, comprises:

performing an interval discrete processing on the position parameter of each of the nodes, to obtain a position discrete parameter of each of the nodes; and obtaining the first weighted value of each of the nodes corresponding to the position discrete parameter, according to a preset third corresponding relationship, wherein the preset third corresponding relationship is set based on the weight, the geometric center, and the volume of the entirety of the robot.

8. The robot of claim 6, wherein the original parameter of the center of gravity of the robot comprises an original offset direction of the center of gravity of the robot, and an original offset of the center of gravity of the robot.

9. The robot of claim 8, wherein the step of correcting the original parameter of the center of gravity of the robot obtained by the gyroscope, according to the body gravity center influence factor of each of the body parts, and the weighted value of each of the body parts, comprises:

correcting the original offset direction of the center of gravity of the robot according to the body gravity center influence factor of each of the body parts; and correcting the original offset of the center of gravity of the robot according to the body gravity center influence factor of each of the body parts, and the weighted value of each of the body parts.

10. The robot of claim 6, wherein the robot is a humanoid robot, the gyroscope is disposed on a heart portion of the robot.

\* \* \* \* \*